United States Patent [19]

Sweet

[11] Patent Number: 5,142,807
[45] Date of Patent: Sep. 1, 1992

[54] DOUBLE-ENDED GRIPPER DEVICE

[76] Inventor: Theodore E. Sweet, 2601 Lucerne Way, Lake Isabella, Calif. 93240-9645

[21] Appl. No.: 684,840

[22] Filed: Apr. 15, 1991

[51] Int. Cl.⁵ .............................................. A01K 97/00
[52] U.S. Cl. ........................................ 43/4; 24/300; 24/493
[58] Field of Search .................. 43/1, 4; 289/17; 24/300, 301, 489, 493; 7/106, 167; 81/487, 488

[56] References Cited

U.S. PATENT DOCUMENTS 3,672,005 6/1972 Barber .................................... 24/300
4,067,134 1/1978 Billings ................................. 43/25.2

Primary Examiner—Kurt Rowan
Attorney, Agent, or Firm—Boniard I. Brown

[57] ABSTRACT

A double-ended gripper device adapted for holding a fishhook to free both hands of a fisherman to tie a fishline to the hook is useful for other purposes, such as holding small wires in position for soldering. The gripping device has two oppositely-extending spring-operated jaws, one of which can be used for mounting the gripper device on a support structure, and the other of which can be used to grip an object such as a fishhook. Both jaws can swivel relative to the central portion of the device so that a gripped component may be held in various orientations relative to the support structure.

6 Claims, 1 Drawing Sheet

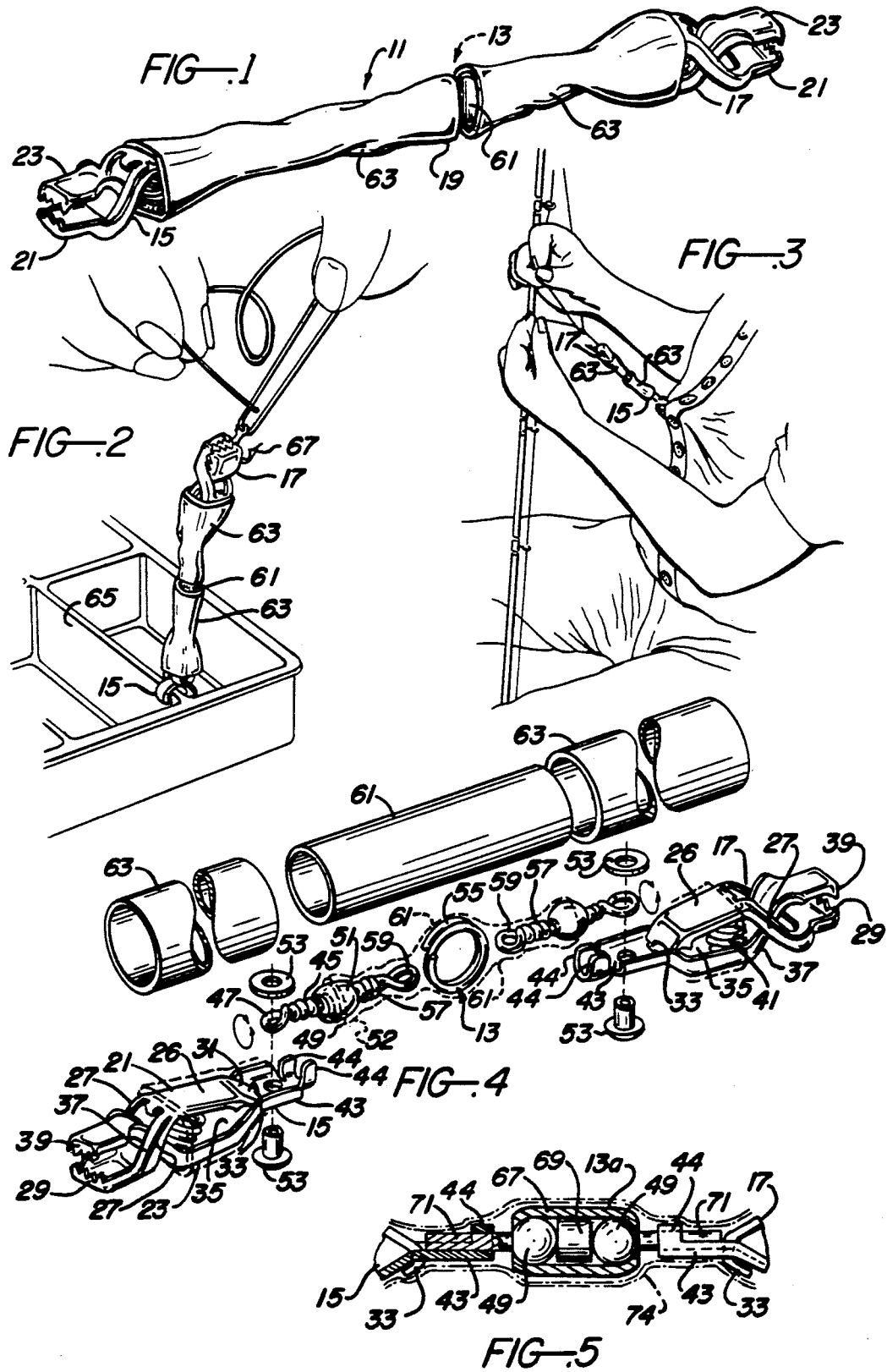

5,142,807

DOUBLE-ENDED GRIPPER DEVICE

BACKGROUND OF THE INVENTION

1. Field of the Invention

The present invention relates to gripper devices for holding small items or sheet materials in desired or fixed positions, typically while work is performed on the items. The gripper device may be used, for example, to hold a fish hook in a fixed position while a fisherman is tying a line to the hook, the gripper device holding the hook in a fixed position so that the person has both hands free for tying the line to the hook. The gripper device can be used for other purposes—e.g., to hold a fabric article during the cutting of a sewn seam with a razor, or to hold electrical wires away from an electrical apparatus while an electrician is working on the apparatus, or to hold two components together during the process of gluing or soldering them together, or to attach tools or rags to a person's clothing for ready access, or to hold small items while the items are being painted.

2. Description of Prior Developments

It is well known that items can be temporarily held in fixed positions by means of a vise, which commonly is attached to a workbench by bolts or screws. A manually rotatable screw is used to advance or retract one of two vise jaws for clamping or unclamping the work, or item being worked on. In such environments as tool shops, a vise usually performs satisfactorily. However, it has some drawbacks. For example, the vise jaws have a fixed line of action so that the clamped items have a fixed orientation, and it is not possible to turn or reorient the work items. Also, vise jaws usually have relatively large face areas in contact with the work, so that extensive surface areas of the work are covered or are inaccessible for purposes of performing work on them.

In most cases, the vise is permanently attached to the workbench, so that the work must be taken to the bench. The conventional vise is not adapted for use away from a workbench—e.g., in an outdoors environment, such as in a fishing boat or alongside an automobile. Another disadvantage of the conventional vise is its mass and bulkiness, which preclude easy transport in a person's pocket, tool box or tackle box.

SUMMARY OF THE INVENTION

The present invention relates to a double-ended gripper device for use in clamping small items in fixed positions—e.g., while certain operations are being performed on the items. Such operations could include tying a fishline to a fishhook, or soldering two components together, or painting a small item, or threading a needle with the aid of a magnifying glass. The device comprises a central elongated arm structure, and a spring-operated jaw means at each end of the arm structure. Each jaw means has a swivel connection to the central arm structure, whereby each jaw means is independently rotatable about the arm structure longitudinal axis.

One of the spring-operated jaw means can be used to clamp the gripper device to a support structure, such as a fishing tackle box, a person's clothing or belt, the edge of a drinking cup, a towel rack, or any other stable structure which fits into the jaw means. The other spring-operated jaw means can be used to grip the work item—e.g., a fishhook, two or more electrical wires, a broken toy to be mended, etc.

In a preferred embodiment of the invention, flexible shrink wrap tube means extend about and along the elongated arm structure and swivel connections for the jaw mechanisms. The inner surface of the shrink wrap material frictionally engages the swivel connections to deter inadvertent dislocation of either jaw mechanism from its position of adjustment. Either jaw mechanism can be swivably adjusted relative to the central arm structure, but the adjusting operation requires a conscious deliberate action on the part of the user. The shrink wrap tubing grips the central arm structure and swivel connections, thus to hold the jaw mechanisms in stable positions of adjustment.

BRIEF DESCRIPTION OF THE DRAWINGS

FIG. 1 is a perspective view of a double-ended gripper device according to the invention;

FIG. 2 illustrates the gripper device of FIG. 1 attached to a fishing tackle box to facilitate tying a fishline to a fish hook;

FIG. 3 shows the gripper device of FIG. 1 attached to a person's clothing to free the person's hands to facilitate tying of a line;

FIG. 4 is an exploded perspective view of the FIG. 1 gripper device; and

FIG. 5 is a fragmentary sectional view of another embodiment of the gripper device of the invention.

DESCRIPTION OF A PREFERRED EMBODIMENT OF THE INVENTION

The drawings illustrate a double-ended gripper device 11 comprising a central arm structure 13 and two spring-operated jaw mechanisms 15 and 17 extending from opposite ends of the central arm structure. The central arm structure and portions of the jaw mechanisms are encased in a flexible shrink wrap tubing 19. The shrink wrap tubing preferably comprises three separate shrink wrap tubes 61, 63 and 63 encircling respective sections of arm structure 13 and the jaw mechanisms.

Each jaw mechanism 15 or 17 comprises two sheet metal jaw members 21 and 23. Each jaw member 21 comprises a flat central plate portion 26, two spaced arms 27 acutely angled to the plate portion, and a serrated jaw portion 29. A tail end portion 31 of jaw member 21 has two laterally-spaced tabs 33 extending loosely through slots in the other jaw member 23, whereby the two jaw members are swingably interconnected. Each jaw member 23 comprises a flat central portion 35, a narrow neck portion 37 extending angularly from plate portion 35 through a rectangular opening in jaw member 21, and a serrated jaw portion 39. The serrated edges of the two jaw portions 29 and 39 mesh or interfit when the jaw members are in the closed relation. A coil spring 41 is trained between the two jaw members to normally hold them in closed relation. The jaw members are separated by manual squeezing force on the outer surfaces of jaw portions 26 and 35.

Longitudinal side edges of jaw members 21 and 23 are flanged for structural reinforcement. An integral attachment wall 43 extends longitudinally from jaw member 23 to connect jaw mechanism 15, 17 to central arm structure 13. Ears 44 on wall 43 extend around a twisted wire connector 45. Each twisted wire connector 45 has an eye 47 at one end and a ball at the other end. The ball 49 (FIG. 4) is enclosed within a flanged sleeve 51 which is part of central arm structure 13. A second ball 52 is disposed within sleeve 51 in axial alignment with the first-mentioned ball. The ball-sleeve assembly (components 49, 51, 52) provides a swivel connection between the central arm structure 13 and each twisted wire connector 45.

Each twisted wire connector 45 is rigidly affixed to the associated jaw mechanism 15 or 17 by means of ears 44 and a rivet assembly 53. The shank of the tubular rivet extends through eye 47 of the twisted wire connector. Each wire connector 45 and the associated jaw mechanism can swivel as a unit about the longitudinal axis of sleeve 51, as indicated by the circular arrows in FIG. 4.

Central arm structure 13 comprises a circular annular wall formed by a curved wire ring element 55. A twisted wire arm member 57 has an eye 59 at one end, and the aforementioned ball 52 at its other end. In practice, each wire arm member 57 is identical to wire connector 45. The eye 59 of each arm member 57 freely encircles a portion of annular wire element 55, whereby either wire member 57 can swing on element 55 in a wide range of directions. The curved wire element 55 comprises a plural number of circular wire convolutions in close contact, whereby an eye 59 can be attached to the curved wire element 55 by prying the wire convolutions apart and sliding the eye along the wire surface until it encircles all of the wire convolutions.

After the two wire arm members 57 are installed on annular wire element 55, a flexible plastic shrink wrap tube 61 is telescoped onto central arm structure 13. The shrink wrap tube is preferably long enough to at least partially envelope both sleeves 51. Typically, the shrink wrap tube has a length of about one inch, the overall length of the double-ended gripper device may be about four and one-half inches. After insertion of tube 61 onto the arm structure 13, heat is applied to the tube to cause it to shrink about the annular wire element 55 and both twisted wire members 57. The flexible shrink wrap tube frictionally engages the internal assembly to stiffen the assembly (members 55 and 57) without entirely rigidifying the component members against adjusting motions. Each member 57 has a normally unstressed position extending along the axis of tube 61, which is the longitudinal axis of arm structure 13. However, each member 57 can be swung to a limited extent about its pivotal connection with annular ring element 55. The flexible semi-resilient tube 61 frictionally engages surface areas of annular ring element 55 and arm members 57, thus to retain members 57 in selected positions of adjustment.

Two additional shrink wrap tubes 63 are telescoped over tube 61 and portions of jaw mechanisms 15 and 17. Thereafter, heat is applied to tubes 63 to shrink them loosely about the jaw mechanisms and tube 61. The inner surface of each tube 63 acts as a frictional connection between tube 61 and the associated jaw mechanism 15 or 17, whereby either jaw mechanism is held in any selected position of swivel adjustment about the axis of central arm structure 13. FIG. 4 shows interior details of the gripper device, and FIG. 1 illustrates the external appearance of the gripper device.

As shown in FIG. 2, the gripper device may have one of its jaws clamped on the edge area of a fishing tackle box wall 65 to detachably mount the gripper device. The shrink wrap tubes give the gripper device a certain degree of rigidity, whereby the device maintains its upright condition without tilting or falling over. The other jaw of the gripper device may be used to hold a fishhook 67 in a fixed position without human assistance. The fisherman thus has both hands free to tie a fishline to the hook.

FIG. 3 shows the double-ended gripper device attached to a person's clothing via one of the jaws 15, 17, while the other jaw holds a fishhook. In another arrangement (not shown), the double-ended gripper device is mounted on a person's belt, with one of the jaws attached to an edge area of the belt.

The double-ended gripper device may be constructed of various different lengths and jaw sizes. Typically, the overall length of the gripper device may be four or five inches, with the open mouth dimension of each jaw being about one-fourth inch. The gripper device may be used as a small portable vise for holding various small items in position to be worked on—e.g., painted, repaired, glued, soldered, sanded, etc. The swivel adjustment of each jaw may be used to select the initial orientation of the clamped item, or to reorient the item for convenient access to different surfaces of the item.

The gripper device may mainly be used to perform the function of a small portable vise. However, it may also be used as a connector—e.g., to attach the hooked end of a fishline to a fishing rod during storage periods. U.S. Pat. No. 4,067,134 relates to a device used for such purpose.

FIG. 5 shows another embodiment of the invention. In FIG. 5, the two jaw mechanisms 15 and 17 are similar to the jaw mechanisms 15 and 17 of FIG. 4. The central arm structure 13a comprises a flanged sleeve 67 long enough to encircle two balls 49 and an intervening cylindrical spacer 69. The attachment wall 43 of each jaw mechanism 15 or 17 engages flatwise against a flat bar 71 welded or otherwise attached to one of the balls 49.

The FIG. 5 construction provides for either jaw mechanism swivelling or rotating about the axis of flanged sleeve 67. A single flexible plastic shrink wrap tube 74 is heat-shrunk about sleeve 67 and portions of jaw mechanisms 15 and 17. The single shrink wrap tube performs the rigidifying and stabilizing functions performed by tubes 61 and 63 of the FIG. 4 construction.

Thus there has been shown and described a novel double-ended gripper device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A double-ended gripper device comprising:
a central arm structure,
two spring-operated jaw structures extending oppositely from the central arm structure, said central arm structure comprising a central annular element and two separate arms extending oppositely from the annular element, each arm having an outer end spaced from the annular element, each arm having an eye encircling a portion of the annular element for sliding motion therealong, whereby each arm is swingable relative to the annular element plane and movable circumferentially about the annular element, and each spring-operated jaw structure having a swivel connected with the outer end of one of said arms, whereby each jaw structure is independently adjustable relative to the central arm structure.

2. The gripper device of claim 1, and further comprising:

flexible shrink wrap tube means encircling the central arm structure and both swivel connections to stabilize the jaw structures against inadvertent dislocation from positions of swivel adjustment.

3. The gripper device of claim 2, wherein:

said shrink wrap tube means comprises a first shrink wrap tube extending about and along the circular ring and the two separate arms, and said shrink wrap tube means further comprises two additional shrink wrap tubes having respective friction fits on the first shrink wrap tube and surface portions of the respective spring-operated jaw structures.

4. A double-ended gripper device comprising:

a central arm structure, two spring-operated jaw structures extending oppositely from said central arm structure, said central arm structure comprising two separate arms and a centrally located pivot connection means therebetween, each arm having an outer end spaced from the centrally located pivot means, said separate arms extending oppositely from said pivot connection means, whereby said arms are angularly adjustable to have different orientations relative to each other, each spring-operated jaw structure having a swivel connection with the outer end of one of said arms, whereby each jaw structure is independently adjustable relative to the central arm structure, a first shrink wrap tube extending about and along the centrally located pivot means and the two separate arms, and two additional shrink wrap tubes having respective friction fits on the first shrink wrap tube and surface portions of the respective spring-operated jaw structures.

5. A double-ended gripper device comprising:

said central arm structure comprises two separate hollow sleeve means and a centrally located pivot connection means therebetween, said two hollow sleeve means extending oppositely from said pivot connection means, two spring-operated jaw structures extending oppositely from said central arm structure, each spring-operated jaw structure having a ball end located within one of the hollow sleeve means to establish a swivel connection between the respective jaw structure and the associated end of the central arm structure, flexible shrink wrap tube means encircling the central arm structure and both swivel connections to stabilize both jaw structures against inadvertent dislocation from positions of swivel adjustment, said flexible shrink wrap tube means comprising a first shrink wrap tube extending about and along the pivot connection means and the two hollow sleeve means, and two additional shrink wrap tubes having friction fits on the first shrink wrap tube and surface portions of the respective spring-operated jaw structures.

6. A double-ended gripper device comprising:

a central arm structure, said central arm structure having opposite ends defined by hollow sleeve means having portions spaced from a central point on the arm structure, two spring-operated jaw structures extending oppositely from said central arm structure, each spring-operated jaw structure having a ball end located within the hollow sleeve means to establish a swivel connection between the respective jaw structure and the associated end of the central arm structure, each jaw structure comprising two opposed jaw members having an associated attachment wall, each ball end having a twisted wire connector including an eye positioned against said attachment wall, and rivet means extending through said eye and attachment wall, and flexible shrink wrap tube means encircling the central arm structure and both swivel connections to stabilize both jaw structures against inadvertent dislocation from positions of swivel adjustment.

* * * * *